United States Patent [19]

Bons et al.

[11] 4,128,769

[45] Dec. 5, 1978

[54] EDUCTOR MUFFLER

[75] Inventors: Robert Bons, Scottsdale; Sam S. Kitaguchi, Phoenix, both of Ariz.

[73] Assignee: The Garrett Corporation, Los Angeles, Calif.

[21] Appl. No.: 727,209

[22] Filed: Sep. 27, 1976

[51] Int. Cl.$^2$ .................... F01D 15/10; H02K 7/18; G10K 11/00
[52] U.S. Cl. ........................ 290/52; 181/213; 181/218; 181/220; 181/222; 181/264; 181/276; 181/282
[58] Field of Search ............ 181/200, 202, 204, 211, 181/213, 212, 218, 220, 227, 228, 226, 284, 286, 290, 292, 296, 247, 248, 264, 268, 262, 263, 250, 258, 279, 256, 252, 217; 290/52

[56] References Cited

U.S. PATENT DOCUMENTS

| 3,386,528 | 6/1968 | Kurtze | 181/218 |
| 3,418,485 | 12/1968 | Anderson et al. | 290/52 |
| 3,685,612 | 8/1972 | Bertin | 181/213 |
| 3,791,682 | 2/1974 | Mitchell | 290/52 |

Primary Examiner—L. T. Hix
Assistant Examiner—Benjamin R. Fuller
Attorney, Agent, or Firm—James W. McFarland; Albert J. Miller

[57] ABSTRACT

A gas turbine engine exhaust duct of combination circular and rectangular configuration, and accompanying muffler which provides cooling and silencing of exhaust flow from the gas turbine engine. The arrangement utilizes minimum space without sacrifice of performance.

14 Claims, 8 Drawing Figures

U.S. Patent   Dec. 5, 1978   Sheet 1 of 3   4,128,769
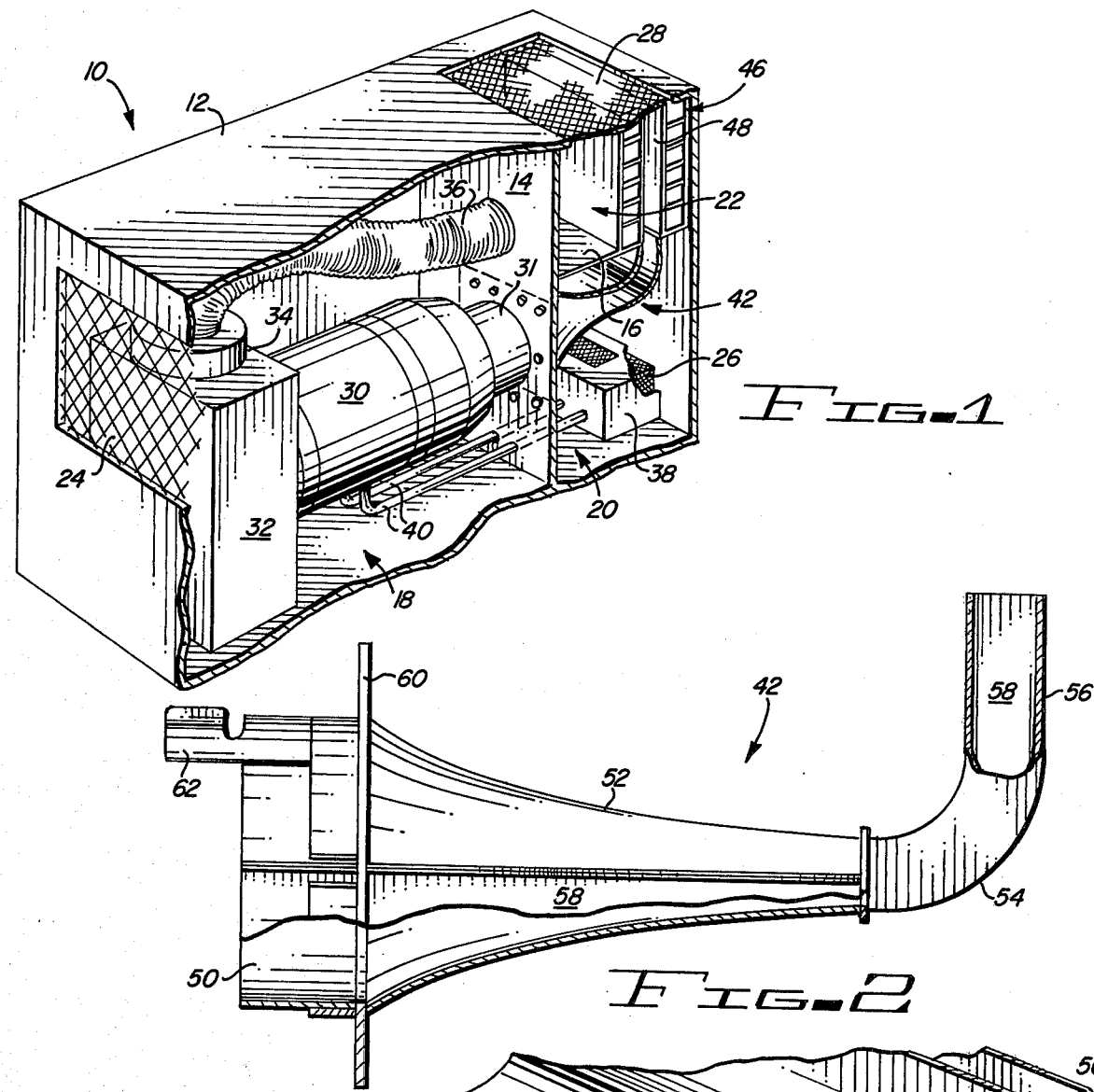
FIG-1
FIG-2
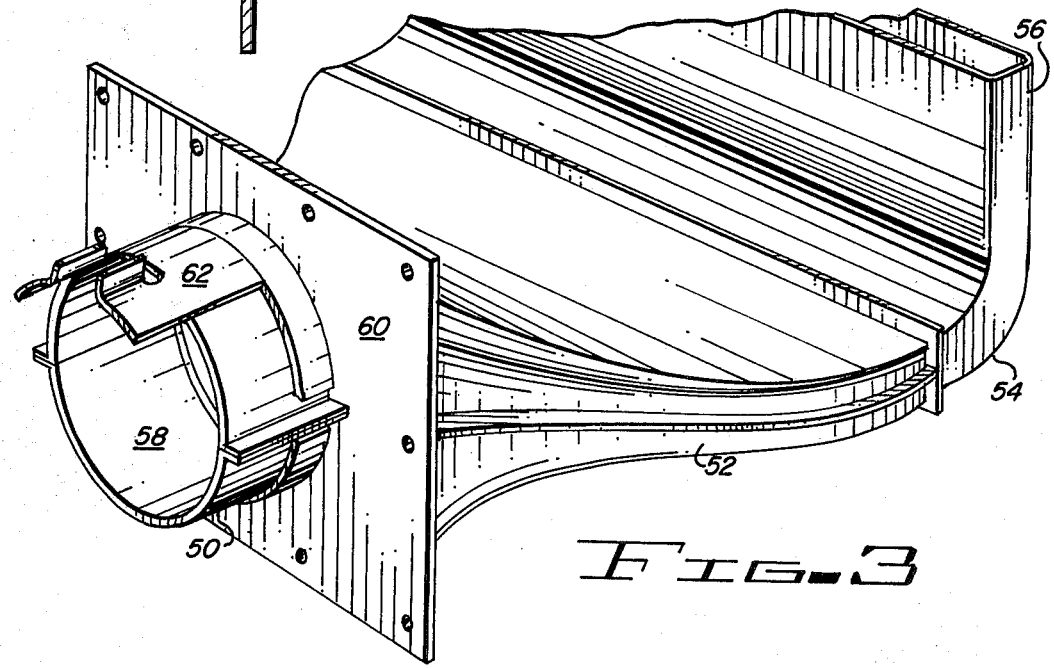
FIG-3

EDUCTOR MUFFLER

BACKGROUND OF THE INVENTION

This invention was made in the course of or under a contract with the Department of the Army.

This invention relates to method and apparatus for providing silencing and cooling of exhaust gas flow from a gas turbine engine.

In many instances of utilization of gas turbine engines, particularly in those installations wherein the engine is used in a ground vehicle or stationary ground installation, silencing and cooling of the exhaust gas flow is especially important. In certain instances it is desirable to change the direction of exhaust flow from the gas turbine engine prior to exit to the surrounding ambient atmosphere. To effect both cooling and silencing of such exhaust gas flow while still allowing turning of the exhaust flow, prior art arrangements become relatively large and bulky, and/or must sacrifice the desired performance levels to conform with the desired packaging configuration of the entire unit. Disclosures of exemplary prior art structures may be found in U.S. Pat. Nos.: 2,370,062; 3,033,494; 3,137,131; 3,611,726; 3,685,612; 3,857,458; and 3,921,906.

SUMMARY OF THE INVENTION

It is a primary object of the present invention to provide improved method and apparatus for cooling and silencing exhaust gas flow from a gas turbine engine in a manner utilizing minimal space while providing exceptional silencing and cooling performance.

A more particular object is to provide such method and apparatus as set forth in the preceding object for use with a gas turbine-generator unit configured for ground installations.

Yet another object of the present invention is to provide a particular configuration of exhaust duct for use in accordance with the preceding objects which minimizes space utilized in the exhaust system by providing a change in configuration of the exhaust gas flow as well as substantial turning of the exhaust gas flow, while permitting eduction of cooling air flow for intermixture with the hot exhaust gas flow in a muffler arrangement associated therewith.

These and other objects and advantages of the present invention are specifically set forth in or will become apparent from the following detailed description of a preferred embodiment of the invention, when read in conjunction with the accompanying drawings.

BRIEF DESCRIPTION OF THE DRAWINGS

FIG. 1 is a perspective view of a generator-turbine unit constructed in accordance with the principles of the present invention, with portions broken away to reveal internal details of construction;

FIG. 2 is a partially cross-sectional, side elevational view of the exhaust duct;

FIG. 3 is a fragmentary perspective view of the exhaust duct of FIG. 2;

DETAILED DESCRIPTION OF THE PREFERRED EMBODIMENT

Figure 4:
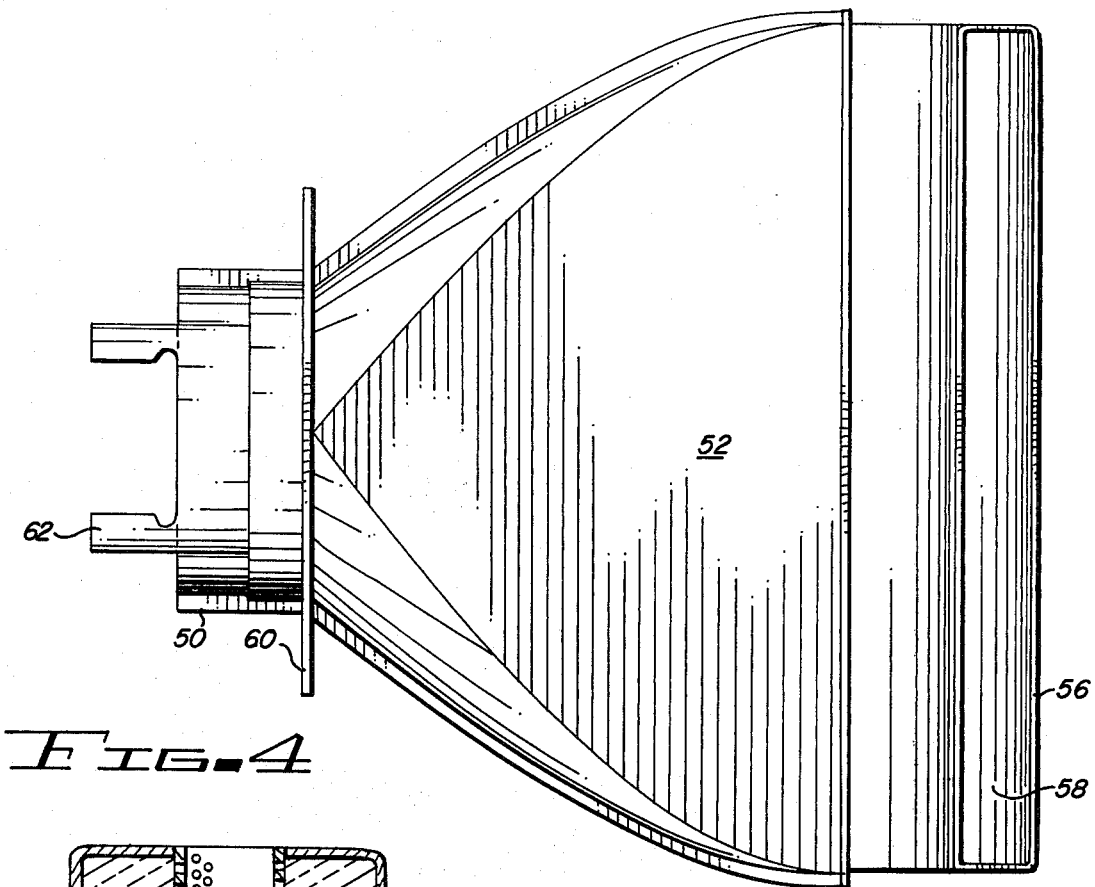
FIG. 4 is a top plan view of the exhaust duct.

Referring now more particularly to the drawings, a gas turbine generator unit generally designated by the numeral 10 includes a housing 12 having internal vertical and horizontal walls 14 and 16 dividing the interior of the housing into first, second and third chambers 18, 20 and 22. Means are provided to allow inflow of ambient cooling air from the exterior of the housing through a pair of air inlets 24 and 26 respectively opening into chambers 18 and 20, while an exhaust port 28 allows exit of exhausted gases from the unit to the surrounding ambient atmosphere. Each of the inlets 24, 26 and port 28 are appropriately covered by a fine wire mesh or screen.

Disposed within first chamber 18 is a gas turbine engine 30 mounted in driving relationship to an electrical generator 32. A scroll plenum and air fan 34 associated with generator 32 acts as an exhaust for cooling air passing through the generator, and this exhausted cooling flow passes through a flexible conduit 36 through an appropriate opening in end wall 14 to the third chamber 22. A heat exchanger 38 is mounted within second chamber 20 adjacent air inlet 26, and carries oil back and forth from turbine 30 via oil lines 40 in heat exchange relationship with the cooling air flow passing through inlet 26 and heat exchanger 38. Exhaust flow from turbine engine 30 passes from a generally circular exhaust nozzle 31 in a substantially horizontal direction toward an associated opening in vertical wall 14 to be received within the interior of an exhaust duct, generally denoted by the numeral 42, which extends from vertical wall 14 to horizontal wall 16 adjacent an opening therein. Vertically aligned above the opening and third chamber 22 is a muffler, generally denoted by the numeral 46, which has a primary internal flow path 48 extending from exhaust duct 42 to exhaust port 28.

Exhaust duct 42 includes an inlet section 50, a transition section 52, a corner section 54, and an outlet section 56. A continuous, internal passage 58 within exhaust duct 42 extends sequentially through sections 50–56. Within inlet section 50 the internal passage 58 is of generally circular cross-section substantially corresponding to the size of the exhaust nozzle associated with the turbine engine. Adjacent the inlet section, a flange 60 and bracket 62, the latter permitting interconnection of the exhaust duct with the exhaust of the turbine engine while allowing for slight misalignment therebetween, allow connection of the exhaust duct to the vertical wall 14 and align the duct 42 with the exhaust nozzle of the turbine engine.

Within the transition section 52 of the exhaust duct, the internal passage 58 passes through a transformation in cross-sectional configuration smoothly changing from the circular configuration at inlet section 58 to a substantially rectangular configuration at the opposite end of the transition section. As noted in FIG. 7, assuming the diameter of the internal passage 58 in inlet section 58 is of a diameter D, the rectangular cross-section at the opposite end of transition section 52 is of a configuration wherein the minor dimension of the rectangular cross-section is approximately D/4. Preferably, the cross-sectional area of the internal passage 58 remains substantially constant throughout the transition section, and accordingly at the opposite end wherein the minor dimension is D/4, the larger dimension of the rectangular cross-section will be on the order of approximately 3D.

Figure 7:
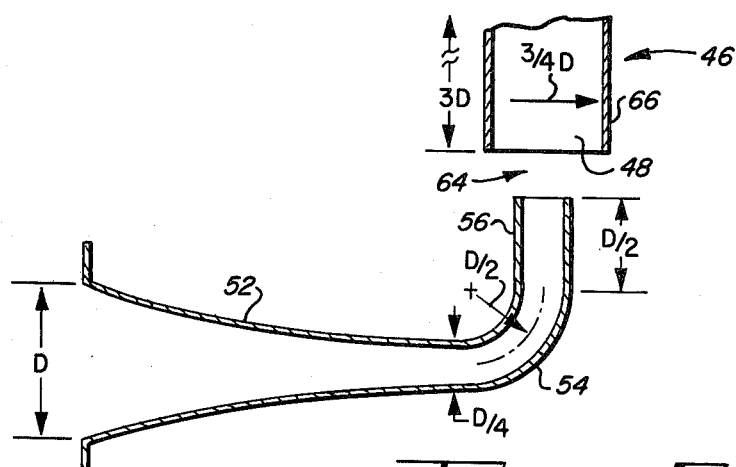
FIG. 7 is a diagrammatic, cross-sectional, side elevational view of the exhaust duct and a portion of the muffler.

The corner section 54 comprises a generally right angle elbow arrangement with a substantially constant radius of curvature. As shown in FIG. 7, the radius of curvature to the center line of internal passage 58 is approximately D/2. The rectangular cross-sectional configuration of internal passage 58 remains substantially constant throughout the corner section 54 as well as the succeeding, vertically arranged outlet section 58 which has a vertical length of approximately D/2. The particular configuration of exhaust duct 42 disclosed assures relatively uniform, smooth flow of exhaust gases from the gas turbine engine, while permitting turning of this exhaust flow to a vertical direction without substantial losses or imposition of deleterious back pressure upon the exhaust flow. Yet, the particular configuration of the exhaust duct 42 allows turning of the exhaust flow approximately 90° in a minimum amount of space.

As clearly illustrated in FIG. 7, the upper end of outlet section 56 is slightly spaced from the primary internal flow path 48 of muffler 46 to present an open space 64 therebetween extending substantially completely around the periphery of the exhaust duct outlet port presented by the opening at the upper end of outlet section 56. Open space 64 is open to the second chamber 20 and presents a relatively large shear surface area and high velocity opening whereby the rush of exhaust gases leaving internal passage 58 from the upper end of outlet section 56 and passing to internal flow path 48 of the muffler sucks or draws in air from chamber 20 through open space 64 into the flow path 48 for intermingling with the exhaust gas flow received from internal passage 58. Thus, this provides an eductor for drawing in cooling air flow from chamber 20, and thus causes the inflow of cooling air from the external surrounding atmosphere through air inlet 26 and the heat exchanger 38. The eductor action maintains a substantially lower pressure within second chamber 20 than the surrounding ambient atmosphere.

Figure 5:
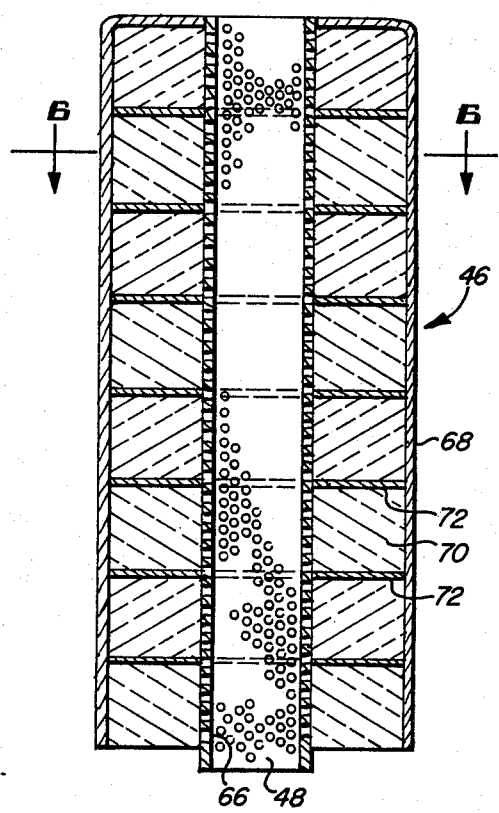
FIG. 5 is a vertical, crossed-sectional elevational view of the muffler.
Figure 6:
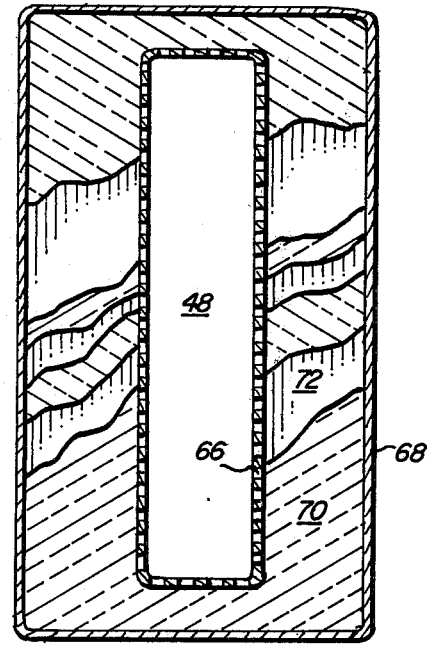
FIG. 6 is a horizontal, plan cross-sectional view taken along lines 6—6 of FIG. 5.
Figure 8:
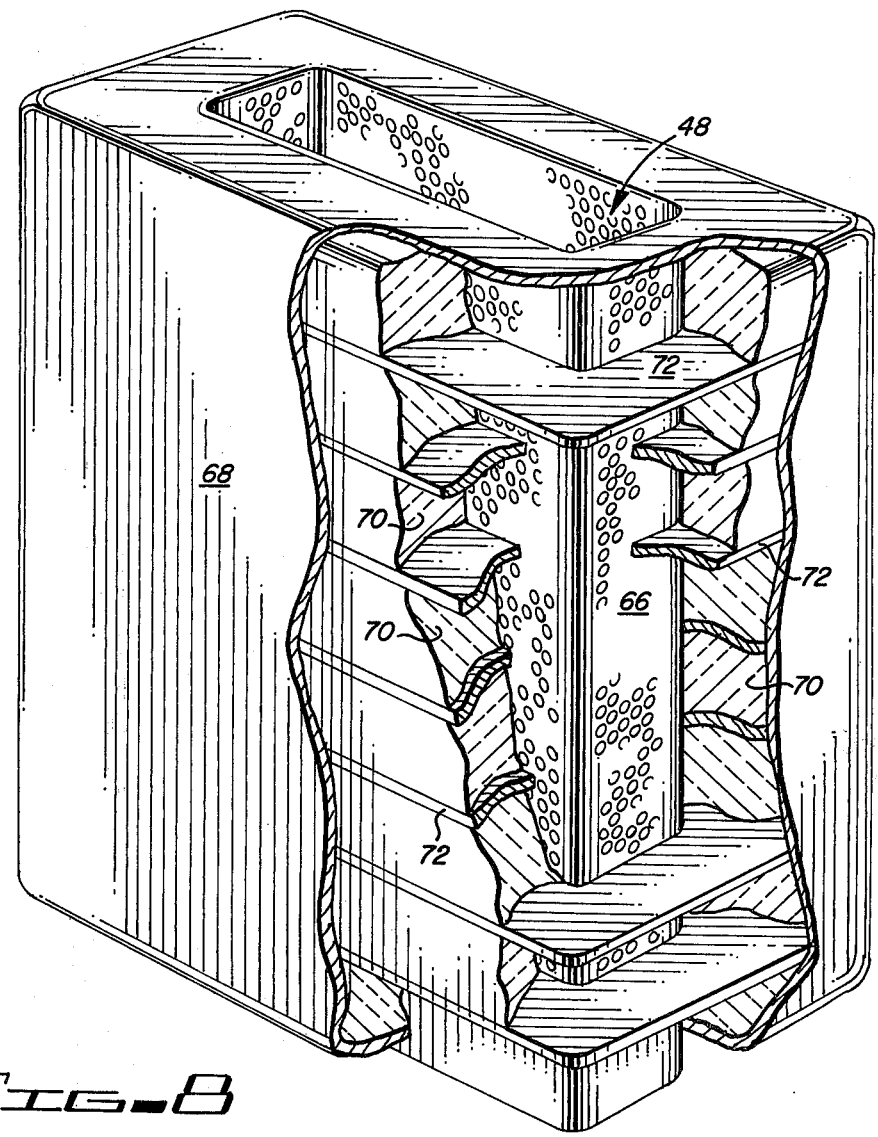
FIG. 8 is a perspective view of the muffler with portions broken away to reveal internal details of construction.

Defining the primary internal flow path 48 of muffler 46 as a rectangular cross-section corresponding to the rectangular cross-section of internal passage 58 and outlet section 56 but of slightly greater dimensions, is a rectangularly formed, vertically extending perforated internal wall 66. As denoted in FIG. 7, the size of perforated wall 66 defines the internal flow path 48 as having a minor dimension of approximately ¾D and a vertical length of approximately 3D. Between internal wall 66 and outer casing 68 of the muffler is disposed a filling of fiber felt or similar sound absorption material 70. Baffles 72 divide this intermediate space into a plurality of separate compartments containing material 70. While only horizontal baffles 72 are illustrated in FIGS. 5, 6 and 8, it will be understood that vertical baffles may also be included if desired. The acoustic attenuating material 70, along with the perforations in wall 66 and the baffles 72, all act to silence the acoustic noise carried by the exhaust gas flow from the turbine engine.

In use, operation of the gas turbine engine drives the electric generator 32 to develop electrical output power. Through various means not illustrated the electrical output power from the generator is conducted to stations of work. Cooling air flow drawn into generator 32 is exhausted by fan 34 through duct 36 to third chamber 22 for exit through the exhaust port 28. Exhaust flow from the gas turbine engine through its exhaust nozzle 31 passes in generally circular configuration into the inlet section 50 of the exhaust duct 42. The exhaust flow is then passed through the transition section 52 and transformed smoothly to a rectangular cross-sectional flow without substantial losses or imposing substantial back pressure upon the exhaust flow. Smoothly turning through corner 54 and then passing through outlet section 58, the engine exhaust flow is smoothly directed into the internal passage 48 of the muffler, again without imposing substantial back pressure penalties. The eductor action by virtue of the rush of exhaust gas flow past open space 64, creates a suction effect to draw in cooling air flow from the external atmosphere through air inlet 26 and the heat exchanger 38, then through the open space 64 into the primary internal passage 48. Within internal passage 48 and the muffler itself, the exhaust gas flow intermixes with the cooling air flow. The intermingling exhaust gas and cooling flow is substantially acoustically treated and attenuated by the perforated wall 66 and the separate, acoustically filled compartments defined by baffle 72, such that the subsequent exiting flow through exhaust port 28 is substantially cooler and quieter than would otherwise be allowed.

The particular configuration of the exhaust duct 42 allows turning of the exhaust flow in a minimum distance while also minimizing the size and space occupied by muffler 48. In comparison to prior art arrangements that rely upon the usual empirically determined effective size of an eductor and a muffler, each of which normally is effective in a length/diameter ratio of approximately 4 to 1, the present invention reduces the effective vertical length of muffler internal flow path 48 to approximately 3D. Accordingly, the particular configuration of the present invention has been found to reduce the net effective size of the exhaust system by approximately one-half without reducing the effectiveness thereof in both cooling and silencing the exhaust flow. These advantages are particularly attributable to the configuration of exhaust duct 42 and its relationship to muffler 48, especially the arrangement of exhaust duct 42 which transforms the exhaust flow from a circular to a rectangular configuration of preselected relative size. The rectangular configuration also permits turning of the exhaust flow on a relatively small radius (D/2) without introducing unnecessary turbulence or back pressure upon the exhaust flow. As a result, it will be apparent from FIG. 7 that by passing a circularly configured exhaust flow of diameter D through transition section 52 whose horizontal length is approximately 1.5D, the exhaust flow can be turned at a radius D/2, then directed through a small length D/2 prior to entry into the similarly rectangular internal flow path 48 of the muffler. The muffler size itself is minimized by a vertical height of only approximately 3D. With an effective minor dimension of approximately ¾D for the rectangular cross-section of internal flow path 48, it will be seen that the effective ratio of the muffler has been maintained at approximately 4 to 1 (i.e. the ratio of the vertical height 3D to the minor dimensions of the rectangular cross-section of ¾D).

From the foregoing it will be apparent that the present invention also provides an improved method for cooling and silencing exhaust flow from a gas turbine engine while allowing a substantially right angle turn in the exhaust gas flow by first transforming the circular exhaust gas configuration to a substantially constant, rectangular configuration having a minor diameter of only one-fourth the diameter of the original circular flow pattern, then turning the rectangular flow on a median radius of approximately D/2, and then discharging the rectangular flow pattern into a similar rectangular internal flow path 48 of the muffler. Eduction occurring at open space 64 allows for the subsequent intermingling and cooling of the exhaust gas flow in conjunction with the acoustic treatment of the exhaust gas flow afforded by the muffler itself.

Various alterations and modifications to the specific embodiment illustrated and described in detail will be apparent to those skilled in the art. Accordingly, the foregoing detailed description of the preferred embodiment of the invention should be considered exemplary in nature and not as limiting to the scope and spirit of the invention as set forth in the appended claims.

Having described the invention with sufficient clarity that those skilled in the art may make and use it, we claim:

1. In combination with a gas turbine engine developing a high temperature, high velocity exhaust gas flow therefrom in a first direction: a compact exhaust duct configured and arranged to smoothly turn said exhaust gas flow to a second direction substantially perpendicular to said first direction, said exhaust duct having sequentially arranged inlet, transition, corner, and outlet sections and a continuous internal passage of substantially constant cross-sectional area extending through said sections, said internal passage being of substantially circular cross-section of a diameter D in said inlet section, of substantially constant rectangular cross-section having a minor dimension of approximately D/4 in said corner and outlet sections, and of a cross-section in said transition section smoothly varying from said circular to said rectangular cross-section, said transition and outlet sections extending respectively in substantially said first and second directions, said corner section smoothly curving from said first direction to said second direction at a substantially constant radius of curvature of approximately D/2, said exhaust duct arranged with said inlet section receiving said exhaust gas flow from said engine.

2. In combination with a gas turbine engine developing a high temperature, high velocity gas flow therefrom in a first direction:
a muffler having a primary internal exhaust gas flow path extending a distance of approximately 3D in a second direction generally perpendicular to said first direction, said muffler including means disposed in substantially surrounding relationship to said primary flow path for attenuating sound developed by said exhaust flow; and
an exhaust extending between said engine and said muffler, said exhaust duct having sequentially arranged inlet, transition, corner, and outlet sections and a continuous, smooth-walled, substantially unobstructed, internal passage of substantially constant cross-sectional area extending sequentially through said sections, said internal passage receiving gas flow only from said engine,
said internal passage having a substantially circular cross-section of a diameter D in said inlet section, said inlet section communicating with and receiving said exhaust flow from said engine,
said internal passage being of a cross-section smoothly varying from said circular cross-section to a generally rectangular cross-section in said transition section, said transition section extending generally in said first direction,
said internal passage being of said rectangular cross-section and having a minor dimension of approximately D/4 in said corner and outlet sections, said corner section smoothly curving from said first direction to said second direction at a substantially constant radius of curvature of approximately D/2, said outlet section extending generally in said second direction,
said outlet section defining an outlet port of said exhaust duct spaced from and aligned with said internal flow path of the muffler whereby flow of said exhaust gases from said outlet port to said internal flow path draws in cooling, ambient air flow into said internal flow path for mixture with said exhaust gas flow in said muffler.

3. A combination as set forth in claim 2, wherein said primary internal flow path of said muffler is of generally rectangular cross-section having a minor dimension of approximately ¾D.

4. A turbine-generator unit comprising:
a housing having first, second, and third chambers and an opening between said second and third chambers;
means for admitting a flow of cooling air into said second chamber;
an exhaust port for exhausting heated gases from said third chamber;
an electric generator mounted in said first chamber;
a gas turbine engine mounted in said first chamber in driving relationship with said generator;
an oil cooler in said second chamber for carrying oil from said turbine engine in heat exchange relationship with said flow of cooling air passing into said second chamber;
muffler means in said third chamber communicating with said opening and said exhaust port; and
an exhaust duct in said second chamber for receiving flow of exhaust gases from said turbine engine and carrying the latter towards said opening, said duct being spaced from said opening whereby flow of exhaust gases from said duct through said opening to said muffler draws in a flow of cooling ambient air from said second chamber to intermix with said exhaust gases in said muffler.

5. A unit as set forth in claim 4, further including a second means for admitting a second flow of cooling air into said first chamber for cooling said generator, and a conduit extending from said generator to said third chamber for carrying said cooling flow of air from said generator to said third chamber for exhaust from said housing through said exhaust port.

6. A unit as set forth in claim 4, wherein said exhaust duct is arranged in said second chamber whereby flow of exhaust gases from said duct toward said muffler draws in said cooling flow of air into said second chamber through said heat exchanger and thence out of said second chamber through said opening.

7. A unit as set forth in claim 4, wherein said third chamber is arranged vertically above said second chamber, said engine arranged whereby said flow of exhaust gas therefrom is in a horizontal direction, said exhaust duct operable to turn said exhaust gas flow to a vertical direction for passage through said muffler.

8. A unit as set forth in claim 7, wherein said exhaust duct has sequentially arranged inlet, transition, corner, and outlet sections and a continuous internal passage extending through said sections, said internal passage being of substantially circular cross-section in said inlet section, of substantially constant rectangular cross-section in said corner and outlet sections, and of a cross-section in said transition section smoothly varying from said circular to said rectangular cross-section, said transition and outlet sections extending respectively in substantially said horizontal and vertical direction.

9. A unit as set forth in claim 8, wherein said circular cross-section is of a diameter D, said rectangular cross-section has a minor dimension of approximately D/4, said radius of curvature being approximately D/2, said outlet section having a length in said vertical direction of approximately D/2.

10. A unit as set forth in claim 9, wherein said muffler extends in said vertical direction a height of approximately 3D.

11. A unit as set forth in claim 10, wherein said muffler has a primary internal flow path for carrying said exhaust gases from said second chamber toward said exhaust port, said primary flow path being of substantially rectangular cross-section having a minor dimension of approximately ¼D.

12. A unit as set forth in claim 11, wherein said muffler includes means substantially surrounding said primary flow path for attenuating sound generated by said exhaust gas flow.

13. A unit as set forth in claim 12, wherein said sound attenuating means includes a perforated wall of substantially rectangular cross-section defining the outer limits of said primary flow path, and sound absorption means disposed exteriorly of said perforated wall.

14. A unit as set forth in claim 13, wherein said sound absorption means includes means defining a plurality of sound absorption compartments each of which communicates with said primary flow path through said perforated wall, and sound absorption material disposed in each of said compartments.

* * * * *